US008219603B2

(12) United States Patent
Aono (10) Patent No.: US 8,219,603 B2
(45) Date of Patent: Jul. 10, 2012

(54) WAVEFORM CORRECTION APPARATUS AND WAVEFORM CORRECTION METHOD

(75) Inventor: Ryuji Aono, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 1199 days.

(21) Appl. No.: 12/021,493

(22) Filed: Jan. 29, 2008

(65) Prior Publication Data

US 2008/0215661 A1    Sep. 4, 2008

(30) Foreign Application Priority Data

Jan. 30, 2007   (JP) .................... 2007-19682

(51) Int. Cl.
G06F 7/38 (2006.01)
G06G 7/22 (2006.01)
G01C 9/00 (2006.01)
G01C 17/00 (2006.01)
G01C 19/00 (2006.01)
G01B 7/14 (2006.01)
G01B 7/30 (2006.01)
G01R 33/00 (2006.01)

(52) U.S. Cl. ... 708/441; 708/809; 702/150; 324/207.11; 324/207.25

(58) Field of Classification Search ............ 708/809, 708/441–442; 324/207.11, 207.24–207.25; 702/150–153
See application file for complete search history.

(56) References Cited

U.S. PATENT DOCUMENTS

| | | | |
|---|---|---|---|
| 4,458,322 A * | 7/1984 | Veale ........................... 702/87 |
| 6,894,487 B2 * | 5/2005 | Kunz-Vizenetz ........ 324/207.25 |
| 7,401,001 B2 * | 7/2008 | Stek et al. ..................... 702/150 |
| 7,668,689 B2 * | 2/2010 | Aono ............................. 702/142 |
| 7,933,373 B2 * | 4/2011 | Kishibe et al. ................ 375/371 |
| 2004/0010386 A1 | 1/2004 | Kameya | |
| 2004/0207392 A1 * | 10/2004 | Kernhof ................... 324/207.25 |

(Continued)

FOREIGN PATENT DOCUMENTS

DE        693 16 845 T2      5/1998

(Continued)

OTHER PUBLICATIONS

English Translation of Office Action issued in a corresponding German Patent Application No. 10 2008 006 526.9-52 on Mar. 18, 2010.

(Continued)

*Primary Examiner* — Lewis A Bullock, Jr.
*Assistant Examiner* — Matthew Sandifer
(74) *Attorney, Agent, or Firm* — DLA Piper LLP (US)

(57) ABSTRACT

This disclosure concerns a waveform corrector comprising a first portion calculating an offset value of an intermediate value between a maximum value and a minimum value of a signal with respect to a reference value; a second portion calculating an actual amplitude of the signal by subtracting the offset value from the maximum value or the minimum value; a third portion generating a first correction signal by subtracting the offset value from the digital signal; a fourth portion subtracting a value obtained by shifting a figure of the actual amplitude from the actual amplitude so that the actual amplitude converges into a reference amplitude; and a fifth portion subtracting a value obtained by shifting the first correction signal by an amount identical to a shift amount of the actual amplitude from the first correction signal so that the first correction signal converges into a second correction signal.

15 Claims, 6 Drawing Sheets

U.S. PATENT DOCUMENTS

2005/0132802 A1* 6/2005 Kobayashi ................ 73/514.31
2010/0185409 A1* 7/2010 Seo ............................ 702/106

FOREIGN PATENT DOCUMENTS

| | | |
|---|---|---|
| DE | 103 31 562 A1 | 1/2004 |
| JP | 2002-243501 | 8/2002 |
| JP | 2006-170837 | 6/2006 |
| TW | 579424 | 3/2004 |

OTHER PUBLICATIONS

English Abstract of DE 693 16 845 T2 issued on May 20, 1998.
English Abstract of DE 103 31 562 A1 issued on Jan. 22, 2004.
English language translation of H. Sugimoto et al., "Fact of the Theory and Design for AC Servo-System", pp. 142-149 (1990).
English Language Abstract of JP 2006-170837 published Jun. 29, 2006.
English Language Translation of JP 2006-170837 published Jun, 29, 2006.
English Language Abstract of JP 2002-243501 published on Aug. 28, 2002.
English Language Translation Abstract of JP 2002-243501 published on Aug. 28, 2002.
Office Action issued in a corresponding German Patent Application No. 10 2008 006 526.9-52 on Mar. 18, 2010.
H. Sugimoto et al., "Fact of the Theory and Design for Servo-System", pp. 142-149 (1990).
Taiwan Office Action issued in TW 97103314 on Aug. 8, 2011.
English Language Abstract of TW 579424 published Mar. 11, 2004.

* cited by examiner

| CHANGING OF ACTUAL COORDINATE | MAXIMUM AND MINIMUM VALUE DETECTOR HOLDING DATA | RESET PRELIMINARY REGISTER (OBJECT OF RESET) |
|---|---|---|
| $0 \to \pi/2 \to \pi, \pi \to \pi/2 \to 0$ | $Ry_{max}$ | PR1 ($y_{max}$) |
| $\pi \to 3\pi/2 \to 0, 0 \to 3\pi/2 \to \pi$ | $Ry_{min}$ | PR2 ($y_{min}$) |
| $3\pi/2 \to 0 \to \pi/2, \pi/2 \to 0 \to 3\pi/2$ | $Rx_{max}$ | PR3 ($x_{max}$) |
| $\pi/2 \to \pi \to 3\pi/2, 3\pi/2 \to \pi \to \pi/2$ | $Rx_{min}$ | PR4 ($x_{min}$) |

WAVEFORM CORRECTION APPARATUS AND WAVEFORM CORRECTION METHOD

CROSS-REFERENCE TO RELATED APPLICATION

This application is based upon and claims the benefit of priority from the prior Japanese Patent Applications No. 2007-19682, filed on Jan. 30, 2007, the entire contents of which are incorporated herein by reference.

BACKGROUND OF THE INVENTION

1. Field of the Invention

The present invention relates to a waveform correction apparatus and a waveform correction method. For example, the present invention relates to a waveform correction apparatus and a waveform correction method used in a position detector detecting a moving body making a rotational movement or a reciprocating movement.

2. Related Art

Generally, a rotary encoder is used as a position detector detecting a position of a moving body (e.g., a servo motor) making a rotational movement, or a linear scale is used as a position detector detecting a position of a moving body making a linear reciprocating movement. An output signal from the position detector is periodically subjected to analog-digital conversion (sampling), converted into a Value indicating an angle or the position, and the resultant digital signal is used. To accurately detect the angle or the position of the moving body, it is necessary to remove offsets of digital signals (a sin signal and a cos signal) obtained by the sampling, and to correct amplitudes of the sin signal and the cos signal to reference values, respectively.

Conventionally, an operator makes the digital signal Correction visually. Specifically, the sin signal and the cos signal are input to a synchroscope and a circle called "Lissajous figure" is displayed on an X-Y plane. The operator adjusts an output circuit or an input circuit while observing a position and a magnitude of the Lissajous figure by the naked eye so as to remove offsets and to correct amplitudes of the signals. This is a normalization operation for the sin signal and the cos signal. The "normalization" is to adjust the Lissajous figure obtained by sampling into a shape according to a predetermined standard.

Needless to say, if the sin signal and the cos signal are to be normalized visually, it is necessary to obtain the synchroscope and manpower. This results in cost increase and longer time. Furthermore, because of visual normalization, it is difficult for even a skilled person to normalize the signals with high accuracy. This disadvantageously causes deterioration in position detection accuracy or velocity detection accuracy.

If an internal response rate of the output circuit of the position detector is low, a voltage width (slew rate) changeable per unit time in the position detector is small. Accordingly, if frequencies of input and output signals to or from the position detector are higher, the phenomenon occurs that amplitudes of the cos signal and the sin signal dynamically fall. In this case, the cos signal and the sin signal cannot be normalized visually.

Therefore, it is an object of the present invention to provide a waveform correction circuit and a waveform correction method capable of correcting a digital signal obtained by sampling a waveform signal at low cost, at high rate, and with high accuracy.

SUMMARY OF THE INVENTION

A waveform correction apparatus according to an embodiment of the present invention, the apparatus for periodically sampling a waveform signal indicating an angle or a position of a moving body making a rotational movement or a reciprocating movement, and for correcting a digital signal obtained by digitizing the waveform signal, the apparatus comprises a maximum and minimum value detector detecting a maximum value and minimum value of the digital signal using a digital signal at a certain time point and digital signals obtained by sampling before the certain point; a first arithmetic portion calculating an offset value of an intermediate value between the maximum value and the minimum value of the digital values with respect to a preset reference value serving as an intermediate value of the waveform signal; a second arithmetic portion calculating an actual amplitude of the digital signal by subtracting or adding the offset value from or to the maximum value or the minimum value of the digital signal; a third arithmetic portion generating a first correction signal by subtracting or adding the offset value from or to the digital signal at the certain time point; a fourth arithmetic portion adding or subtracting a value obtained by shifting a figure of the actual amplitude from or to the actual amplitude so that the actual amplitude converges into a preset reference amplitude; and a fifth arithmetic portion adding or subtracting a value obtained by shifting the first correction signal by an amount identical to a shift amount of the actual amplitude from or to the first correction signal so that the first correction signal converges into a second correction signal, the fifth arithmetic portion simultaneously executing addition or subtraction with execution of addition or subtraction by the fourth arithmetic portion.

The fourth arithmetic portion repeatedly calculates an equation 1 or an equation 2 until $A_i$ converges into the preset reference amplitude or until next sampling is executed:

$$A_i = A_{i-1} + A\max \times 2^{-i} \qquad \text{(Equation 1)}$$

$$A_i = A_{i-1} - A\max \times 2^{-i} \qquad \text{(Equation 2)}$$

where $i=1, 2, \ldots n$, $A_0 = A\max$, and the Amax is the actual amplitude, and the fifth arithmetic portion repeatedly calculates an equation 3 or an equation 4 until the $A_i$ converges into the preset reference amplitude or until the next sampling is executed:

$$y_i = y_{i-1} + ya \times 2^{-i} \qquad \text{(Equation 3)}$$

$$y_i = y_{i-1} - ya \times 2^{-i} \qquad \text{(Equation 4)}$$

where $i=1, 2, \ldots n$, $y_0 = ya$, and the ya is the digital signal at the certain time point.

When the actual amplitude is lower than the reference amplitude, the fourth arithmetic portion calculates the equation 1 and the fifth arithmetic portion calculates the equation 3, and when the actual amplitude is higher than the reference amplitude, the fourth arithmetic portion calculates the equation 2 and the fifth arithmetic portion calculates the equation 4.

The digital signal is expressed by a sin signal and a cos signal, and the first arithmetic portion to the fifth arithmetic portion are provided to respectively correspond to each of the sin signal and the cos signal, and the first arithmetic portion to the fifth arithmetic portion respectively execute calculations for the sin signal and the cos signal.

The digital signal is expressed by a sin signal and a cos signal, and the first arithmetic portion to the fifth arithmetic portion are provided to respectively correspond to the sin signal and the cos signal, and the first arithmetic portion to the fifth arithmetic portion respectively execute calculations for the sin signal and the cos signal.

The digital signal is expressed by a sin signal and a cos signal, and the first arithmetic portion to the fifth arithmetic portion are provided to respectively correspond to the sin signal and the cos signal, and the first arithmetic portion to the fifth arithmetic portion respectively execute calculations for the sin signal and the cos signal.

The waveform correction apparatus can further comprise a maximum and minimum value register holding a maximum value xmax of the cos signal, a minimum value xmin of the cos signal, a maximum value ymax of the sin signal, and a minimum value ymin of the sin signal from among a plurality of digital signals sampled in an interval in which a sign of one of the sin signal and the cos signal is constant.

The first arithmetic portion is an adder adding up the maximum value and the minimum value of the digital signal, and shifting a figure of an addition result value by one.

The waveform correction apparatus can further comprise a first lowpass filter provided between the maximum and minimum value register and the second arithmetic portion; and a second lowpass filter provided between the first arithmetic portion and the second arithmetic portion.

The waveform correction apparatus can further comprise a first calculation value register holding a calculation result of the fourth arithmetic portion; a second calculation value register holding a calculation result of the fifth arithmetic portion; a first selector transmitting the actual amplitude to the fourth arithmetic portion in an initial calculation right after a sampling, and transmitting data held in the first calculation value register to the fourth arithmetic portion in calculations after the initial calculation; a second selector transmitting the first correction signal to the fifth arithmetic portion in an initial calculation right after the sampling, and transmitting data held in the second calculation value register to the fifth arithmetic portion in calculations after the an initial calculation; a comparator comparing the actual amplitude or the data held in the first calculation value register which is selected by the first selector with the reference amplitude, and deciding addition or subtraction as the calculations executed by the fourth and the fifth arithmetic portions according to the comparison result; a first shifting portion shifting a figure of the actual amplitude; a second shifting portion shifting a figure of the first correction signal; and a correction value register holding the second correction signal.

The digital signal is expressed by a sin signal and a cos signal, and the first arithmetic portion to the fifth arithmetic portion, the first calculation value register and the second calculation value register, the first selector and the second selector, the first shifting portion and the second shifting portion, and the correction value register are provided to correspond to each of the sin signal and the cos signal.

A waveform correction method according to an embodiment of the present invention periodically sampling a waveform signal indicating an angle or a position of a moving body making a rotational movement or a reciprocating movement, and correcting a digital signal obtained by digitizing the waveform signal, the method comprises detecting a maximum value and minimum value of the digital signal using a digital signal at a certain time point and digital signals obtained by sampling before the certain point; a first arithmetic operation to calculate an offset value of an intermediate value between the maximum value and the minimum value of the digital values with respect to a preset reference value serving as an intermediate value of the waveform signal; a second arithmetic operation to calculate an actual amplitude of the digital signal by subtracting or adding the offset value from or to the maximum value or the minimum value of the digital signal; a third arithmetic operation to generate a first correction signal by subtracting or adding the offset value from or to the digital signal at the certain time point; a fourth arithmetic operation to add or subtract a value obtained by shifting a figure of the actual amplitude from or to the actual amplitude so that the actual amplitude converges into a preset reference amplitude; and a fifth arithmetic operation to add or subtract a value obtained by shifting the first correction signal by an amount identical to a shift amount of the actual amplitude from or to the first correction signal so that the first correction signal converges into a second correction signal, the fifth arithmetic operation being simultaneously executed with the fourth arithmetic operation.

In the fourth arithmetic operation, an equation 1 or an equation 2 is repeatedly calculated until $A_i$ converges into the preset reference amplitude or until next sampling is executed:

$$A_i = A_{i-1} + A\max \times 2^{-i} \quad \text{(Equation 1)}$$

$$A_i = A_{i-1} - A\max \times 2^{-i} \quad \text{(Equation 2)}$$

where i=1, 2, ... n, $A_0$=Amax, and the Amax is the actual amplitude, and in the fifth arithmetic operation, an equation 3 or an equation 4 is repeatedly calculated until the $A_i$ converges into the preset reference amplitude or until the next sampling is executed:

$$y_i = y_{i-1} + ya \times 2^{-i} \quad \text{(Equation 3)}$$

$$y_i = y_{i-1} - ya \times 2^{-i} \quad \text{(Equation 4)}$$

where i=1, 2, ... n, $y_0$=ya, and the ya is the digital signal at the certain time point.

When the actual amplitude is lower than the reference amplitude, the equation 1 is calculated in the fourth arithmetic operation, and the equation 3 is calculated in the fifth arithmetic operation, and when the actual amplitude is higher than the reference amplitude, the equation 2 is calculated in the fourth arithmetic operation, and the equation 4 is calculated in the fifth arithmetic operation.

The digital signal is expressed by a sin signal and a cos signal, and the first arithmetic operation to the fifth arithmetic operation are respectively executed to each of the sin signal and the cos signal.

The digital signal is expressed by a sin signal and a cos signal, and the first arithmetic operation to the fifth arithmetic operation are respectively executed to each of the sin signal and the cos signal.

The digital signal is expressed by a sin signal and a cos signal, and the first arithmetic operation to the fifth arithmetic operation are respectively executed to each of the sin signal and the cos signal.

The waveform correction circuit and the waveform correction method according to the present invention can correct a digital signal obtained by sampling a waveform signal at low cost, at high rate, and with high accuracy.

DETAILED DESCRIPTION OF THE INVENTION

Embodiments of the present invention will be explained below in detail with reference to the accompanying drawings. Note that the invention is not limited thereto.

Figure 1:
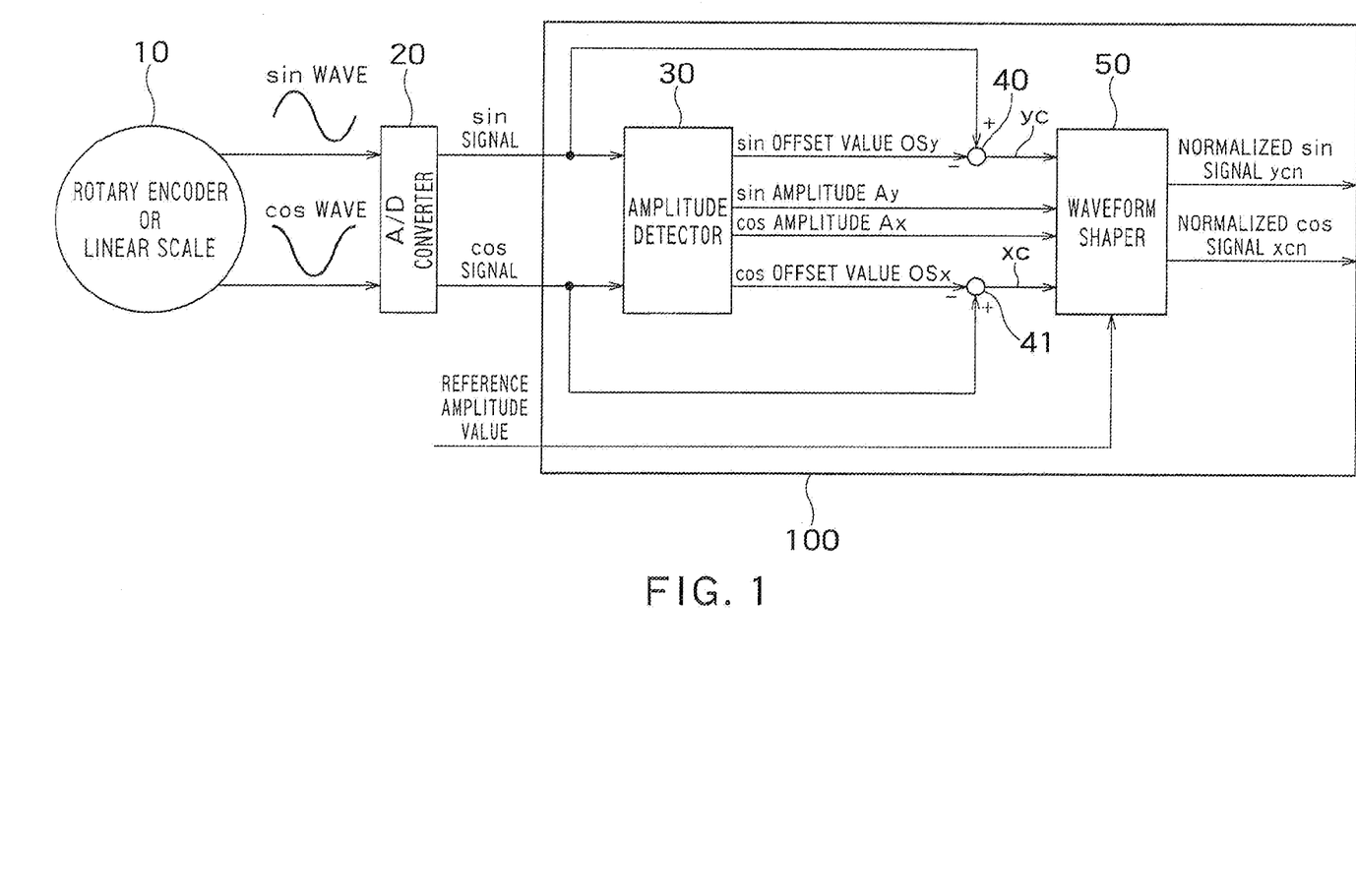
FIG. 1 is a block diagram of a waveform correction apparatus 100 according to an embodiment of the present invention.
Figure 7:
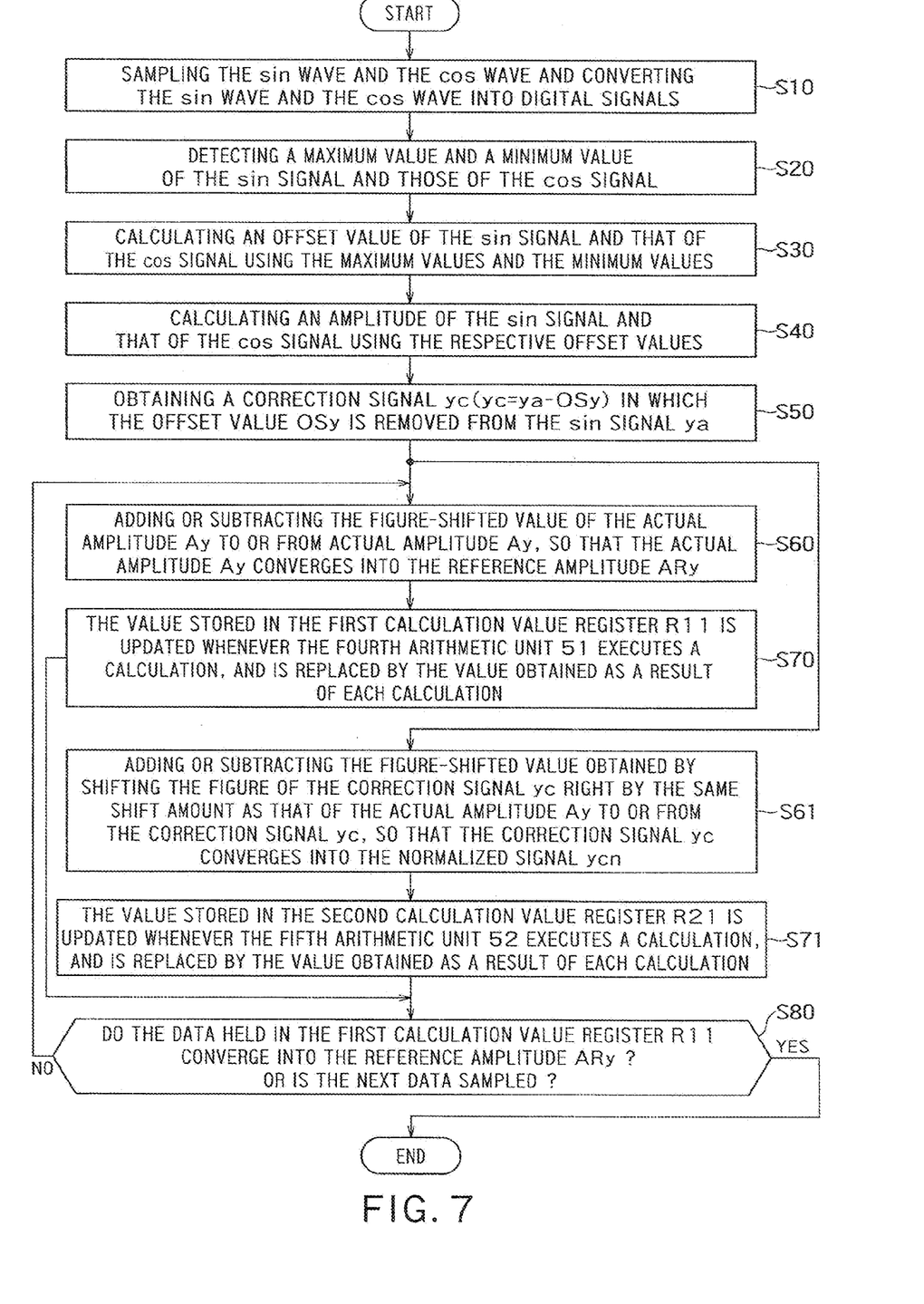
FIG. 7 is a flowchart of operation performed by the waveform correction apparatus 100 shown in FIG. 1.

FIG. 1 is a block diagram of a waveform correction apparatus 100 according to an embodiment of the present invention. FIG. 7 is a flowchart of operation performed by the waveform correction apparatus 100 shown in FIG. 1. A rotary encoder or linear scale 10 outputs analog sine wave signals (sin wave, cos wave) indicating a position of a moving body making a rotational movement or a reciprocating movement. The sin wave and the cos wave are values of the sine wave in orthogonal phase. Since the moving body does not necessarily make a uniform motion, frequencies of the sin wave and the cos wave change.

An A/D converter 20 periodically samples the sin wave and the cos wave from the rotary encoder or linear scale 10 and converts the sin wave and the cos wave into digital signals. Digitized coordinate signals (sin signal, cos signal) are thereby generated (S10).

The waveform correction apparatus 100 includes an amplitude detector 30, subtractors 40 and 41 which serve as a third arithmetic unit, and a waveform shaper 50. The waveform correction apparatus 100 is configured to receive the sin signal and the cos signal from the A/D converter 20, corrects the sin signal and the cos signal, and to output a normalized sin signal and a normalized cos signal. The amplitude detectors 30, the subtractors 40 and 41, and the waveform shaper 50 are preferably constituted by a digital logic circuit. The amplitude detectors 30, the subtractors 40 and 41, and the waveform shaper 50 can be constituted by, for example, a custom LSI such as an ASIC (Application Specific Integrated Circuit) or an FPGA (Field Programmable Gate Array). Alternatively, the amplitude detector 30, the subtractors 40 and 41, and the waveform shaper 50 can be constituted by a general-purpose CPU and a program. The waveform correction apparatus 100 is provided in a machine including, for example, a moving body making a rotational movement or a reciprocating movement. The moving body is, for example, a rotor, an arm making a reciprocating movement of a servo motor disposed in a machine tool.

Figure 4:
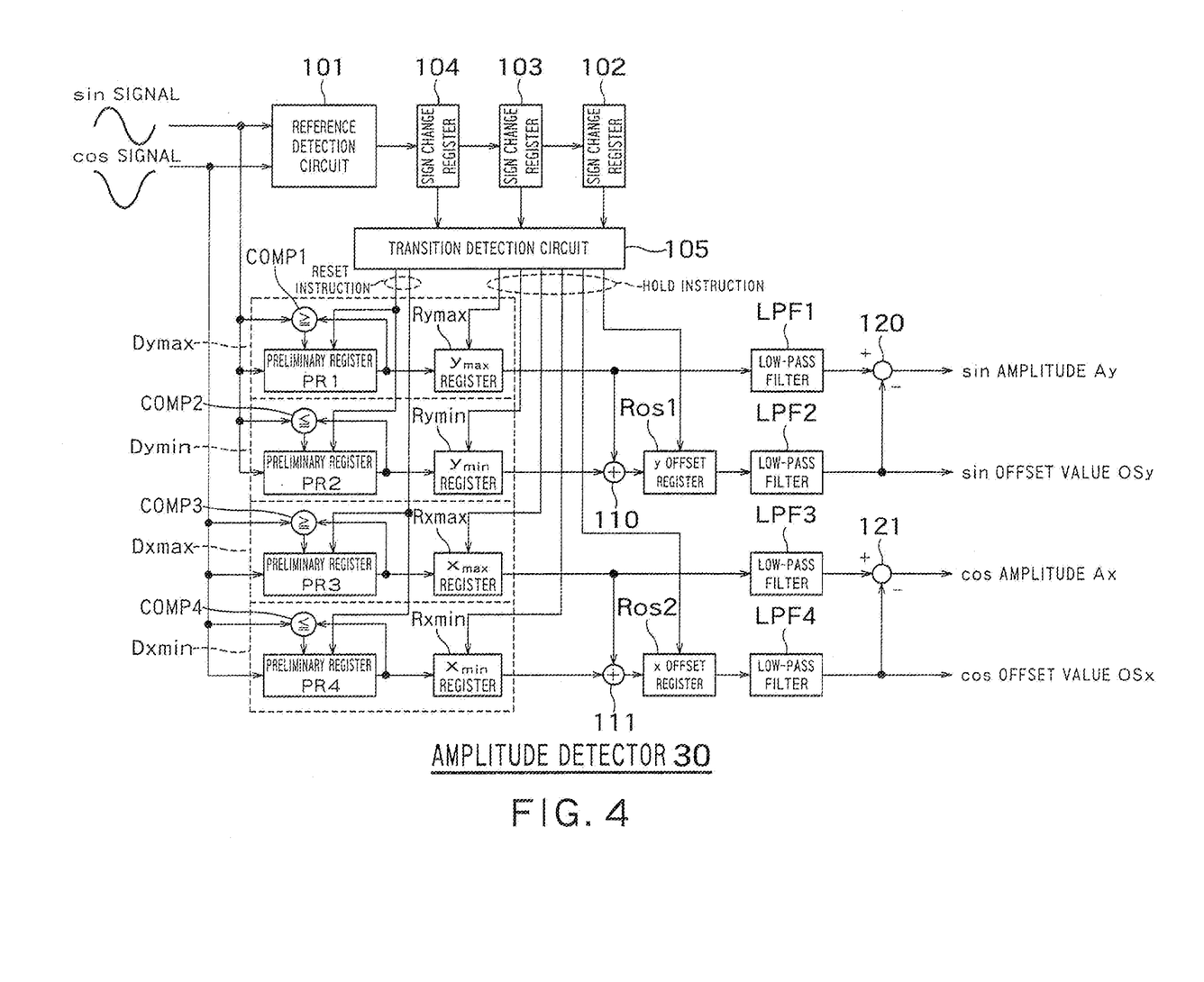
FIG. 4 is a block diagram showing an internal configuration of the amplitude detector 30.

The amplitude detector 30 receives the sin signal and the cos signal, and detects a maximum value and a minimum value of the sin signal and those of the cos signal (S20). Further, the amplitude detector 30 calculates an offset value of the sin signal and that of the cos signal using the maximum values and the minimum values (S30). The "offset value" means a potential difference between a preset reference potential (e.g., zero volt) and an intermediate value between the maximum value and the minimum value of each digital signal. The amplitude detector 30 calculates an amplitude of the sin signal and that of the cos signal using the respective offset values (S40). The amplitude detector 30 is configured to include adders and subtractors without using multipliers and dividers as shown in FIG. 4.

Figure 2:
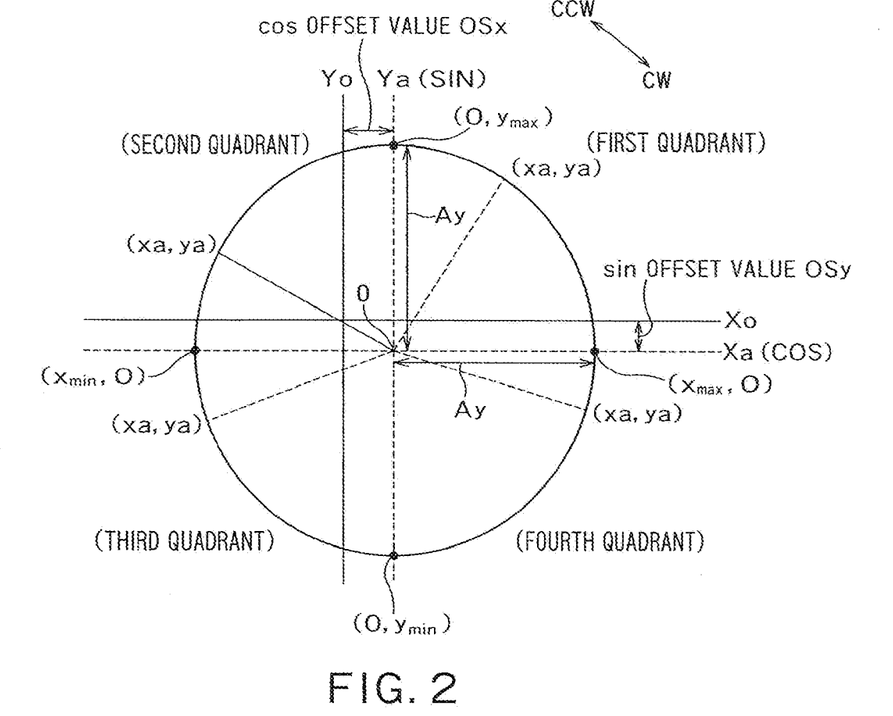
FIG. 2 is a conceptual diagram showing functions of the amplitude detector 30.

FIG. 2 is a conceptual diagram showing functions of the amplitude detector 30. FIG. 2 displays the cos signal and the sin signal obtained by a plurality of sampling operations. In FIG. 2, a vertical axis Ya indicates a value of the sin signal and a horizontal axis Xa indicates a value of the cos signal. An actual coordinate (cos signal, sin signal) sampled at a certain time point is denoted by (xa, ya).

The actual coordinate (xa, ya) is a circumferential coordinate sampled by the A/D converter 20 and indicates an actual position or angle of a moving body. Xa and Ya are axes (actual axes) for actual coordinates. Xo and Yo are target reference axes. An origin O of Xo and Yo corresponds to a reference potential. Reference coordinates are (xmax, 0), (0, ymax), (xmin, 0) and (0, ymin). The reference coordinates are cross points between a Lissajous figure and the actual axes Xa and Ya.

Differences between the reference axes (Xo, Yo) and the actual axes (Xa, Ya) correspond to offset values. The amplitude detector 30 detects an offset value OSx of the cos signal, an offset value OSy of the sin signal, an actual amplitude Ax of the cos signal, and an actual amplitude Ay of the sin signal using xmax, ymax, xmin, and ymin.

The subtractor 40 subtracts the offset value OSy of the sin signal from the actual sin signal ya obtained from the A/D converter 20. As a result, a correction signal yc (yc=ya−OSy) in which the offset value OSy is removed from the sin signal ya is obtained (S50). The subtractor 41 subtracts the offset value OSx of the cos signal from the actual cos signal xa obtained from the A/D converter 20. As a result, a correction signal xc (xc=xa−OSx) in which the offset value OSx is removed from the sin signal xa is obtained. Namely, the subtractors 40 and 41 function to translate the Lissajous figure so as to be adjusted to the actual axes Xa and Ya and the reference axes Xo and Yo using the offset values OSx and Osy. If signs of the offset values are inverted, adders can be replaced by the subtractors 40 and 41.

The waveform shaper 50 receives the correction signal yc of the sin signal ya and the correction signal xc of the sin signal xa. The waveform shaper 50 substantially obtains a normalized signal ycn (ycn=yc*Dy) by reducing or enlarging the correction signal yc at a ratio Dy. Further, the waveform shaper 50 substantially obtains a normalized signal xcn (xcn=xc*Dx) by reducing or enlarging the correction signal xc at a ratio Dx. The ratio Dy is a ratio (ARy/Ay) of a preset reference amplitude ARy to the actual amplitude Ay of the sin signal ya. The ratio Dx is a ratio (ARx/Ax) of a preset reference amplitude ARx to the actual amplitude Ax of the cos signal xa. The reference amplitudes ARx and ARy are target amplitudes defined according to a standard specification and common to a plurality of apparatuses of the same type.

Figure 3:
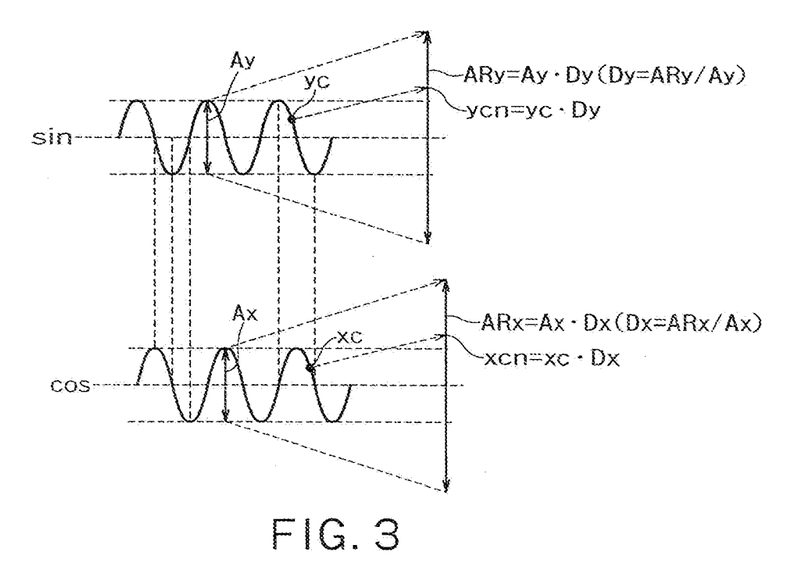
FIG. 3 is a conceptual diagram showing functions of the waveform shaper 50.

FIG. 3 is a conceptual diagram showing functions of the waveform shaper 50. The waveform shaper 50 is configured to substantially enlarge or reduce the actual amplitudes Ax and Ay to be adjusted to the reference amplitudes ARx and ARy, and to substantially enlarge or reduce the correction signals xc and yc at the same ratios as ratios of the enlargement or reduction. The waveform shaper 50 thereby corrects the correction signals xc and yc to the normalized signals xcn and ycn, respectively. The waveform shaper 50 is configured to calculate the normalized signals only by addition and subtraction without executing multiplication (yc*Dy, xc*Dx) and division (ARy/Ay, ARx/Ax).

In this manner, the amplitude detector 30 detects the offset values and the amplitudes of the respective actual signals ya and xa. The subtractors 40 and 41 remove offsets from the respective-actual signals ya and xa. The waveform shaper 50 enlarges or reduces the actual signals ya and xa so that the actual amplitudes are adjusted to the reference amplitudes. As a result, the actual signals ya and xa are corrected to the normalized signals xcn and ycn, respectively. The normalized signals xcn and ycn can be used for position detection and velocity detection.

Generally, a divider and a multiplier are circuits difficult to realize by digital circuits. To realize the divider and the multiplier, it is necessary to use far larger-scale digital circuits than those for the adder and the subtractor. Therefore, if the division and the multiplication are realized by digital logic, the circuit scale is made large and cost increases. Due to this, it is difficult to realize the division and the multiplication by inexpensive FPGA or the like.

The waveform correction apparatus 100 according to the embodiment is configured to include adders and subtractors without using the dividers and multipliers. The entire waveform correction apparatus 100 is, therefore, quite small in scale. Furthermore, because of lack of the dividers and multipliers, the waveform correction apparatus 100 according to the embodiment can be easily realized by the logic circuit such as the inexpensive FPGA. As a result, the waveform correction apparatus 100 can be manufactured at low cost. Moreover, the waveform correction apparatus 100 according to the embodiment repeatedly executes simple addition and subtraction. As compared with the general-purpose CPU and the program, the logic circuit such as the FPGA or the ASIC is suited to repeatedly execute such simple operation at high rate. The waveform correction apparatus 100 can, therefore, calculate the normalized signals in short time. Needless to say, the waveform correction apparatus 100 can normalize the sin signal and the cos signal in shorter time and with higher accuracy than the operator.

FIG. 4 is a block diagram showing an internal configuration of the amplitude detector 30. The amplitude detector 30 includes a reference detection circuit 101, sign change registers 102 to 104, a transition detection circuit 105, maximum or minimum detection circuits (hereinafter, often simply "detection circuits") Dymax, Dymin, Dxmax, and Dxmin, adders 110 and 111 serving as a first arithmetic unit, subtractors 120 and 121 serving as a second arithmetic unit, offset registers Ros1 and Ros2, and lowpass filters LPF1 to LPF4.

The reference detection circuit 101 receives the actual coordinate (cos signal, sin signal)=(xa, ya). The reference detection circuit 101 detects that the moving body has passed through the four reference coordinates (xmax, 0), (0, ymax), (xmin, 0), and (0, ymin). The reference detection circuit 101 can detect the passing by detecting changes in the signs of the sin signal and the cos signal. The sign change registers 102 to 104 hold changes in the signs of the actual coordinate (xa, ya) when the moving body passes through the four reference coordinates (xmax, 0), (0, ymax), (xmin, 0), and (0, ymin). The three sign change registers 102 to 104 can hold past three histories of the signs of the actual coordinate (xa, ya).

The transition detection circuit 105 transmits an instruction to the maximum or minimum detection circuits Dymax, Dymin, Dxmax, and Dxmin based on transition of the signs held in the sign change registers 102 to 104. For example, if the actual coordinate (xa, ya) rotates in order of 0, $\pi/2$, and $\pi$, the sign change registers 102 to 104 hold data of (+, +), (−, +), and (−, −) as (sign of xa, sign of ya), respectively. The transition detection circuit 105 can discriminately recognize that the actual coordinate of the moving body moves to a first quadrant, a second quadrant, and a third quadrant. If the actual coordinate (xa, ya) rotates in order of $\pi/2$, $\pi$, and $(3/2)\pi$, the sign change registers 102 to 104 hold data of (−, +), (−, −), and (+, −), respectively. The transition detection circuit 105 can discriminately recognize that the actual coordinate of the moving body moves to the second quadrant, the third quadrant, and a fourth quadrant. If the actual coordinate (xa, ya) rotates in order of $\pi$, $(3/2)\pi$, and 0, the sign change registers 102 to 104 hold data of (−, −), (+, −), and (+, +), respectively. The transition detection circuit 105 can discriminately recognize that the actual coordinate of the moving body moves to the third quadrant, the fourth quadrant, and a fifth quadrant. If the actual coordinate (xa, ya) rotates in order of $(3/2)\pi$, 0, and $\pi/2$, the sign change registers 102 to 104 hold data of (+, −), (+, +), and (−, +), respectively. The transition detection circuit 105 can discriminately recognize that the actual coordinate of the moving body moves to the fourth quadrant, the first quadrant, and the second quadrant. It is to be noted that the above-stated instances are those in which the moving body rotates counterclockwise CCW. Likewise, even if the moving body rotates clockwise CW, the transition detection circuit 105 can detect transition of the actual coordinate of the moving body.

The detection circuits Dymax, Dymin, Dxmax, and Dxmin are configured to hold the maximum value ymax of ya, the minimum value ymin of ya, the maximum value xmax of xa, and the minimum value xmin of xa among a plurality of actual coordinates (xa, ya) sampled in an interval in which the sign of one of the actual coordinates xa and ya is constant respectively.

For example, the detection circuit Dymax is configured to hold the maximum value ymax of ya among a plurality of actual coordinates sampled in an interval in which the sign of ya in the actual coordinate (xa, ya) is positive (+). More specifically, the detection circuit Dymax includes a preliminary register PR1 holding a preliminary maximum value of ya, a comparator COMP1 comparing the data held in the preliminary register PR1 with the actual coordinate ya, and a register Rymax holding the maximum value ymax.

The preliminary register PR1 holds the actual coordinate ya sampled first. The comparator COMP1 compares the sampled actual coordinate ya with data obtained by previous sampling and stored in the preliminary register PR1, and returns a greater value to the preliminary register PR1. By repeating these operations, the value stored in the preliminary register PR1 is updated whenever sampling is performed and closer to the maximum value ymax.

The register Rymax holds a value of the preliminary register PR1 in response to a holding instruction from the transition detection circuit 105. The transition detection circuit 105 outputs this holding instruction at the end of the interval in which the sign of ya is positive (+). This is because at the end of this interval, the moving body rotates once or reciprocate once and the value stored in the preliminary register PR1 becomes a maximum. The value stored in the register Rymax is updated whenever the moving body rotates once or reciprocates once.

If the moving body operates at high velocity, frequencies of the cos wave and the sign wave are high. Sampling is periodically executed at certain time intervals. Due to this, if the moving body operates at high velocity, sampling becomes relatively coarse. Accordingly, the maximum value ymax stored in the register Rymax almost indicates an apex of the sin wave but does not necessarily indicates an apex value accurately, and slightly changes for every rotation or reciprocation of the moving body. Considering these, the lowpass filter LPF1 is provided between the register Rymax and the subtractor 120. A cutoff frequency of the lowpass filter LPF1 is lower than frequencies of the sine waves (sin wave, cos wave). The lowpass filter LPF1 can, therefore, stabilize the maximum value ymax output from the register Rymax.

The preliminary register PR1 is reset in response to a reset instruction from the transition detection circuit 105. The transition detection circuit 105 outputs the reset instruction either simultaneously with or right after the holding instruction. It is thereby possible to reset the preliminary register PR1 after the register Rymax holds the value of the preliminary register PR1.

The detection circuit Dymin is configured to hold the minimum value ymin of ya among a plurality of actual coordinates sampled in an interval in which the sign of ya in the actual coordinate (xa, ya) is negative (−). More specifically, the detection circuit Dymin includes a preliminary register PR2 holding a preliminary minimum value of ya, a comparator COMP2 comparing the data held in the preliminary register PR2 with the actual coordinate ya, and a register Rymin holding the minimum value ymin.

The preliminary register PPR2 holds the actual coordinate ya sampled first. The comparator COMP2 compares the sampled actual coordinate ya with data obtained by previous sampling and stored in the preliminary register PR2, and returns a smaller value to the preliminary register PR2. By repeating these operations, the value stored in the preliminary register PR2 is updated whenever sampling is performed and closer to the minimum value ymin.

The register Rymin holds a value of the preliminary register PR2 in response to a holding instruction from the transition detection circuit 105. The transition detection circuit 105 outputs this holding instruction at the end of the interval in which the sign of ya is negative (−). This is because at the end of this interval, the moving body rotates once or reciprocate once and the value stored in the preliminary register PR2 becomes a minimum. The value stored in the register Rymin is updated whenever the moving body rotate once or reciprocates once.

The adder 110 is connected between the registers Rymax and Rymin and the offset register Ros1. The adder 110 adds up ymax and ymin and halves an addition result value. As a result, the offset value OSy is calculated. For example, if ymax=10 and ymin=−8, the offset value Osy is 1. It is to be noted that actual calculation made by the adder 110 is executed by a binary digital value. To halve the binary digital value, a figure of the digital value is shifted right by one. To "shift right" means to shift a figure of a certain value in a direction in which the value is smaller. Accordingly, it suffices that the adder 110 simply adds up ymax and ymin and shifts the figure of the addition result value right by one.

The offset value OSy calculated by the adder 110 is stored in the offset register Ros1. The offset register Ros1 holds the offset value OSy when receiving a holding instruction from the transition detection circuit 105.

The offset value OSy slightly changes for every rotation or reciprocation of the moving body similarly to the maximum value ymax. Considering this, the lowpass filter LPF2 is provided between the offset register Ros1 and the subtractor 120. A cutoff frequency of the lowpass filter LPF2 is lower than those of the sine waves (sin wave, cos wave) and can, therefore, stabilize the offset value OSy output from the offset register Ros1.

The subtractor 120 subtracts the offset value OSy from the maximum value ymax. The actual amplitude Ay of the sin signal is thereby obtained. In the embodiment, the subtractor 120 subtracts the offset value OSy from the maximum value ymax. Alternatively, the subtractor 120 can subtract the minimum value ymin from the offset value OSy. This is because the amplitude Ay can be calculated even by the alternative calculation.

Similarly to the actual coordinate ya (sin signal), the actual coordinate xa (cos signal) is also subjected to the calculation. As a result, the offset value OSx and the actual amplitude Ax of the cos signal are obtained. For example, the detection circuit Dxmax is configured to hold the maximum value xmax of xa among a plurality of actual coordinates sampled in an interval in which the sign of xa in the actual coordinate (xa, ya) is positive (+). More specifically, the detection circuit Dxmax includes a preliminary register PR3 holding a preliminary maximum value of xa, a comparator COMP3 comparing the data held in the preliminary register PR3 with the actual coordinate xa, and a register Rxmax holding the maximum value xmax.

The preliminary register PR3 holds the actual coordinate xa sampled first. The comparator COMP3 compares the sampled actual coordinate xa with data obtained by previous sampling and stored in the preliminary register PR3, and returns a greater value to the preliminary register PR3. By repeating these operations, the value stored in the preliminary register PR3 is updated whenever sampling is performed and closer to the maximum value xmax.

The register Rxmax holds a value of the preliminary register PR3 in response to a holding instruction from the transition detection circuit 105. The transition detection circuit 105 outputs this holding instruction at the end of the interval in which the sign of xa is positive (+). This is because at the end of this interval, the moving body rotates once or reciprocates once and the value stored in the preliminary register PR3 becomes a maximum.

The preliminary register PR3 is reset in response to a reset instruction from the transition detection circuit 105. The transition detection circuit 105 outputs the reset instruction either simultaneously with or right after the holding instruction. It is thereby possible to reset the preliminary register PR3 after the register Rxmax holds the value of the preliminary register PR3.

The lowpass filter LPF3 is provided between the register Rxmax and the subtractor 121. Similarly to the other lowpass filters, the lowpass filter LPF3 can stabilize the maximum value xmax output from the register Rxmax.

The detection circuit Dxmin is configured to hold the minimum value xmin of xa among a plurality of actual coordinates sampled in an interval in which the sign of xa in the actual coordinate (xa, ya) is negative (−). More specifically, the detection circuit Dxmin includes a preliminary register PR4 holding a preliminary minimum value of xa, a comparator COMP4 comparing the data held in the preliminary register PR4 with the actual coordinate xa, and a register Rxmin holding the minimum value xmin.

The preliminary register PR4 holds the actual coordinate xa sampled first. The comparator COMP4 compares the sampled actual coordinate xa with data obtained by previous sampling and stored in the preliminary register PR4, and returns a smaller value to the preliminary register PR4. By repeating these operations, the value stored in the preliminary register PR4 is updated whenever sampling is performed and closer to the minimum value xmin.

The register Rxmin holds a value of the preliminary register PR4 in response to a holding instruction from the transition detection circuit 105. The transition detection circuit 105 outputs this holding instruction at the end of the interval in which the sign of xa is negative (−). This is because at the end of this interval, the moving body rotates once or reciprocates once and the value stored in the preliminary register PR4 becomes a minimum. The value stored in the register Rxmin is updated whenever the moving body rotates once or reciprocates once.

The adder 111 is connected between the registers Rxmax, Rxmin and the offset register Ros2. The adder 111 adds up xmax and xmin and halves an addition result value. As a result, the offset value OSx is calculated. Accordingly, it suffices that the adder 111 simply adds up xmax and xmin and shifts the figure of the addition result value right by one.

The offset value OSx calculated by the adder 111 is stored in the offset register Ros2. The offset register Ros2 holds the offset value OSx when receiving a holding instruction from the transition detection circuit 105.

The offset value OSx slightly changes for every rotation or reciprocation of the moving body similarly to the maximum value xmax in the register Rxmax. Considering this, the lowpass filter LPF4 is provided between the offset register Ros2 and the subtractor 121. A cutoff frequency of the lowpass filter LPF4 can stabilize the offset value OSx output from the offset register Ros2.

The subtractor 121 subtracts the offset value OSx from the maximum value xmax. The actual amplitude Ax of the sin signal is thereby obtained. In the embodiment, the subtractor 121 subtracts the offset value OSx from the maximum value xmax. Alternatively, the subtractor 121 can subtract the minimum value xmin from the offset value OSx. This is because the amplitude Ax can be calculated even by the alternative calculation.

Figure 5:
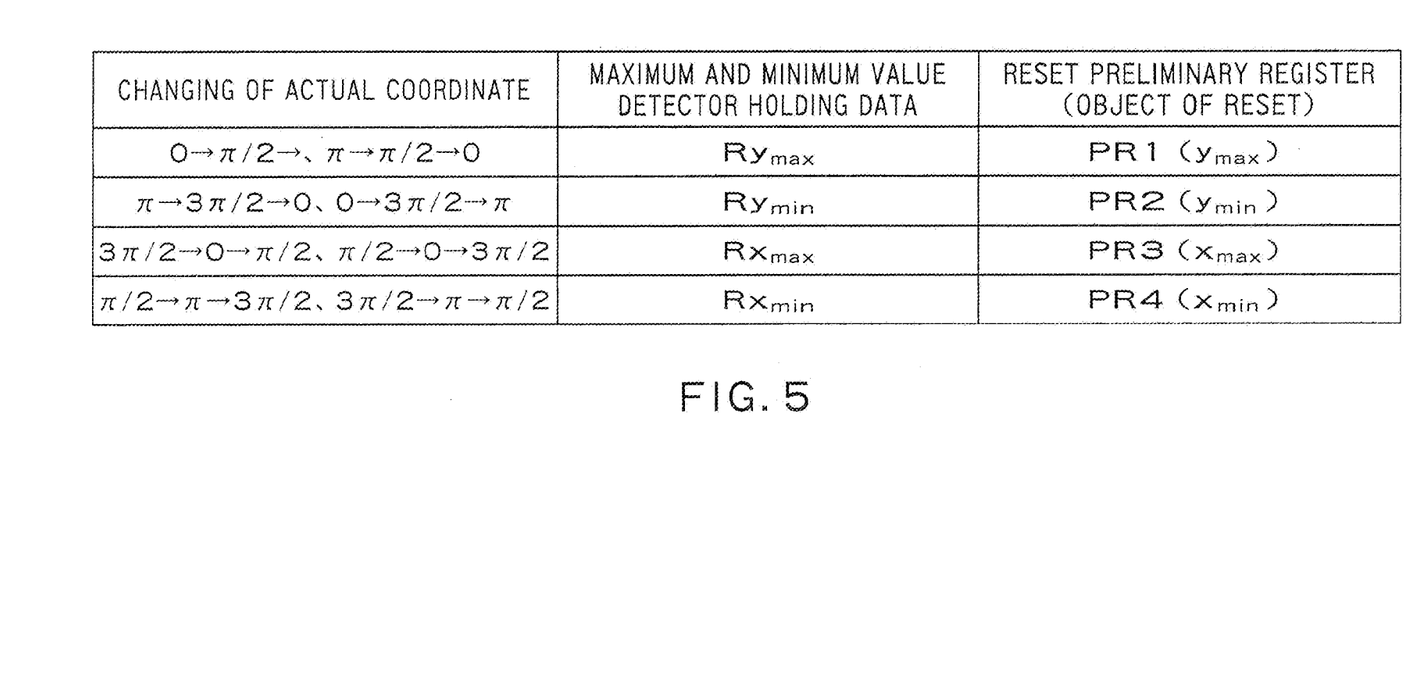
FIG. 5 is a table showing holding instruction target registers and reset instruction target registers in relation to transition of the actual coordinate (xa, ya)

FIG. 5 is a table showing holding instruction target registers and reset instruction target registers in relation to transition of the actual coordinate (xa; ya). If the actual coordinate (xa, ya) changes in order of 0, π/2, and π or in order of π, π/2, and 0, the sign of ya is positive (+). Accordingly, if the actual coordinate moves in this order, the transition detection circuit 105 outputs a holding instruction to the register Rymax. The register Rymax holds the value stored in the preliminary register PR1 as ymax in response to the holding instruction. At this time or right after this time, the transition detection circuit 105 outputs the reset instruction to the preliminary register PR1. The value stored in the preliminary register PR1 is thereby reset.

If the actual coordinate (xa, ya) changes in order of π, (3/2)π, and 0 or in order of 0, (3/2)π, and π, the sign of ya is negative (−). Accordingly, if the actual coordinate moves in this order, the transition detection circuit 105 outputs a holding instruction to the register Rymin. The register Rymin holds the value stored in the preliminary register PR2 as ymin in response to the holding instruction. At this time or right after this time, the transition detection circuit 105 outputs the reset instruction to the preliminary register PR2. The value stored in the preliminary register PR2 is thereby reset.

If the actual coordinate (xa, ya) changes in order of (3/2)π, 0, π/2 or in order of π/2, 0, and (3/2)π, the sign of xa is positive (+). Accordingly, if the actual coordinate moves in this order, the transition detection circuit 105 outputs a holding instruction to the register Rxmax. The register Rxmax holds the value stored in the preliminary register PR3 as xmax in response to the holding instruction. At this time or right after this time, the transition detection circuit 105 outputs the reset instruction to the preliminary register PR3. The value stored in the preliminary register PR3 is thereby reset.

If the actual coordinate (xa, ya) changes in order of π/2, π, and (3/2)π or in order of (3/2)π, π, and π/2, the sign of xa is negative (−). Accordingly, if the actual coordinate moves in this order, the transition detection circuit 105 outputs a holding instruction to the register Rxmin. The register Rxmin holds the value stored in the preliminary register PR4 as xmin in response to the holding Instruction. At this time or right after this time, the transition detection circuit 105 outputs the reset instruction to the preliminary register PR4. The value stored in the preliminary register PR4 is thereby reset.

The moving body does not necessarily rotate at constant velocity in constant direction. Due to this, an update frequency of the register Rymax is often unequal to that of the register Rxmin. For example, if the update frequency of the Rymax is lower than that of the register Rxmin, an update interval of the Rymax is longer. If offset amounts or the velocity of the moving body changes in the interval, the maximum value ymax becomes an incorrect value as compared with the minimum value ymin. To avoid such a problem, the amplitude detector 30 preferably updates the registers Rymin and Rymax as a pair and updates the registers Rxmin and Rxmax as a pair.

Referring back to FIG. 11 functions of the subtractors 40 and 41 will be described. The subtractor 4015 provided between the amplitude detector 30 and the waveform shaper 50. The subtractor 40 subtracts the offset value OSy from the actual coordinate ya. If the offset value OSy is positive, the actual coordinate ya is deviated toward plus side from the reference axis Yo. If the offset value OSy is negative, the actual coordinate ya is deviated toward minus side from the reference axis Yo. Accordingly, by causing the subtractor 40 to calculate (ya−OSy), an offset component is removed from the actual coordinate ya. As a result, the correction signal yc as a first correction signal is obtained.

The subtractor 41 is provided between the amplitude detector 30 and the waveform shaper 50. The subtractor 41 subtracts the offset value OSx from the actual coordinate xa. If the offset value OSx is positive, the actual coordinate xa is deviated toward plus side from the reference axis Xo. If the offset value OSx is negative, the actual coordinate xa is deviated toward minus side from the reference axis Xo. Accordingly, by causing the subtractor 41 to calculate (xa−OSx), an offset component is removed from the actual coordinate xa. As a result, the correction signal xc as a first correction signal is obtained.

If signs of the offset values OSy and OSx are inverted, adders can be used as the third arithmetic unit 40 and 41 in place of the subtractors. An instance where the signs of the offset values OSy and OSx are inverted is, for example, an instance where an inverter (not shown) is present as a buffer between the offset registers Ros1 and Ros2 and the third arithmetic unit 40 and 41.

Figure 6:
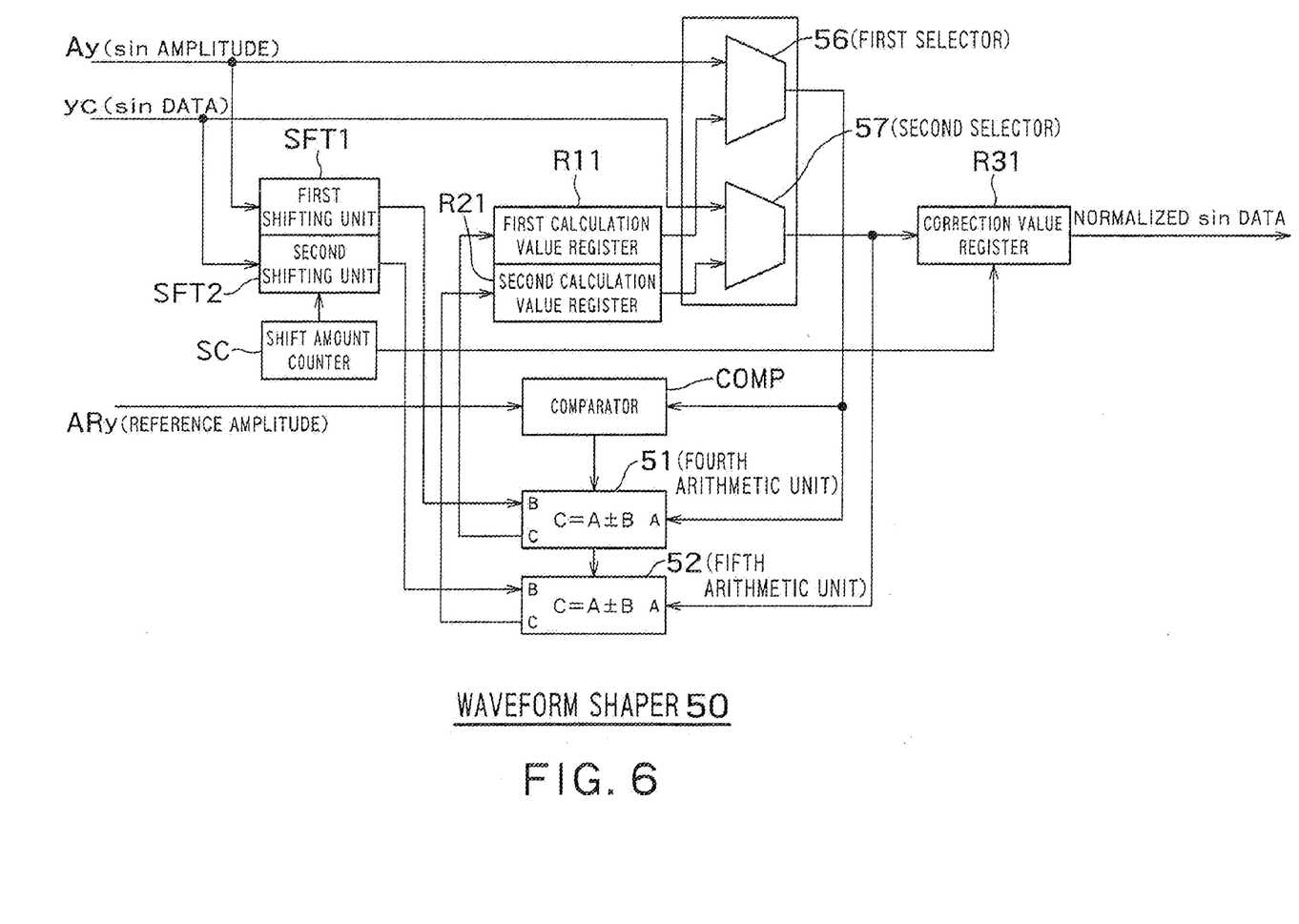
FIG. 6 is a block diagram showing an internal configuration of the waveform shaper 50.

FIG. 6 is a block diagram showing an internal configuration of the waveform shaper 50. The waveform shaper 50 performs an independent and identical processing on each of the sin signal and the cos signal. Accordingly FIG. 6 shows the waveform shaper 50 related to the sin signal and does not show the waveform shaper 50 related to the cos signal. FIG. 7 is a flowchart showing operation performed by the waveform correction apparatus 100 according to the embodiment of the present invention.

The waveform shaper 50 includes a fourth arithmetic unit 51, a fifth arithmetic unit 52, a first selector 56, a second selector 57, a first calculation value register R11, a second calculation value register R21, a correction value register R31, a comparator COMP, a first shifting unit SFT1, a second shifting unit SFT2, and a shift amount counter SC.

The waveform shaper 50 receives the actual amplitude Ax and the first correction signal yc. The actual amplitude Ax and the first correction signal yc are transmitted to the first and second selectors 56 and 571 respectively. The actual amplitude Ax and the first correction signal yc are also transmitted to the first and second shifting units SFT1 and SFT2, respectively.

The first selector 56 selects the actual amplitude Ax first right after sampling at a certain time point, and transmits the actual amplitude Ax to the comparator COMP and the fourth arithmetic unit 51. Thereafter, the first selector 56 transmits data held in the first calculation value register R11 until the next sampling to the comparator COMP and the fourth arithmetic unit 51.

The second selector 57 selects the correction signal yc first right after sampling at the certain time point, and transmits the correction signal yc to the fifth arithmetic unit 52. Thereafter, the second selector 57 transmits data held in the second calculation value register R21 until the next sampling to the fifth arithmetic unit 52.

Meanwhile, the first shifting unit SFT1 shifts the figure of the actual amplitude Ay expressed by the binary digital value right, and transmits the figure-shifted value to the fourth arithmetic unit 51. The second shifting unit SFT2 shifts the correction signal yc expressed by the binary digital value right, and transmits the figure-shifted value to the fifth arithmetic unit 52.

The shift amount counter SC decides shift amounts (the number of figures) by which the first and second shifting units SFT1 and SFT2 shift the actual amplitude Ay and the correction signal yc, respectively. Right after the sampling, a shift amount i is 1. Thereafter, the shift amount i increments by one whenever each of the fourth and fifth arithmetic units 51 and 52 executes a calculation. The first and second shifting units SFT1 and SFT2 shift the actual amplitude Ay and the correction signal yc by the same amount, respectively.

The comparator COMP compares the actual amplitude Ay selected by the first selector 56 or the data held in the first calculation value register R11 with the reference amplitude ARy. Further, the comparator COMP decides which calculation the fourth and fifth arithmetic units 51 and 52 execute, the addition or the subtraction. The types of the calculation (addition or subtraction) executed by the fourth and fifth arithmetic units 51 and 52 are the same. Namely, if the fourth arithmetic unit 51 executes addition, the fifth arithmetic unit 52 also executes addition. If the fourth arithmetic unit 51 executes subtraction, the fifth arithmetic unit 52 also executes subtraction.

The fourth arithmetic unit 51 adds or subtracts the figure-shifted value obtained by causing the first shifting unit SFT1 to shift the figure of the actual amplitude Ay right to or from actual amplitude Ay, so that the actual amplitude Ay converges into the reference amplitude ARy (S60). Detailed calculations made by the fourth and fifth arithmetic units 51 and 52 will be described later. The fourth arithmetic unit 51 transmits a value obtained as a result of the addition or the subtraction to the first calculation value register R11. The value stored in the first calculation value register R11 is updated whenever the fourth arithmetic unit 51 executes a calculation, and is replaced by the value obtained as a result of each calculation (S70).

Synchronously with the fourth arithmetic unit, the fifth arithmetic unit 52 adds or subtracts the figure-shifted value obtained by causing the second shifting unit SFT2 to shift the figure of the correction signal yc right by the same shift amount as that of the actual amplitude Ay to or from the correction signal yc, so that the correction signal yc converges into the normalized signal yen (S61). The fifth arithmetic unit 52 transmits a value obtained as a result of the addition or the subtraction to the second calculation value register R21. The value stored in the second calculation value register R21 is updated whenever the fifth arithmetic unit 52 executes a calculation, and is replaced by the value obtained as a result of each calculation (S71).

The fourth and fifth arithmetic units 51 and 52 repeatedly execute the calculations while increasing the shift amount by which the figure of the actual amplitude Ay is shifted right and the shift amount by which the figure of the correction signal yc is shifted right.

If the actual amplitude Ay or the data held in the first calculation value register R11 is higher than the reference amplitude ARy, the comparator COMP decides to set the type of the calculation executed by the fourth and fifth arithmetic units 51 and 52 to the subtraction. If the actual amplitude Ay or the data held in the first calculation value register R11 is lower than the reference amplitude ARy, the comparator COMP decides to set the type of the calculation executed by the fourth and fifth arithmetic units 51 and 52 to the addition. The fourth arithmetic unit 51 repeatedly executes the calculation, whereby the data held in the first calculation value register R11 converges into the reference amplitude ARy. Furthermore, the fifth arithmetic unit 52 repeatedly executes the calculation, whereby the data held in the second calculation value register R21 converges into the normalized signal ycn.

The fourth and fifth arithmetic units 51 and 52 repeatedly executes calculations until the data held in the first calculation value register R11 converge into the reference amplitude ARy or until the next sampling is executed (S80). After the fourth and fifth arithmetic units 51 and 52 finishes executing calculations, the correction value register R31 stores therein the data held in the second calculation value register R21. The data stored in the correction value register R31 is output to the position detection circuit, the velocity detection circuit or the like as the normalized signal ycn.

The calculations executed by the fourth and fifth arithmetic units 51 and 52 will be described in detail. To normalize the correction signal yc, it is necessary to substantially calculate yc×Dy. The ratio Dy can be expressed by a binary number such as $Dy=\Sigma(D(i)-BD(i))\times 2^{-i}$. In the equation of Dy, symbol i indicates a bit number if the ratio Dy is expressed by the binary number, and D(1) indicates the most-significant bit value and the value is less significant, if i is greater. BD(i) indicates a value obtained by inverting a value of an $i^{th}$ bit. Accordingly, (D(i)−BD(i)) could be either 1 or −1. Namely, the ratio Dy is obtained by repeating addition or subtraction of $2^{-1}$ such as $Dy=\pm 2^{-1}\pm 2^{-2}\pm 2^{-3}$ . . . . Using this fact, a calculation equation executed by each of the fourth and fifth arithmetic units 51 and 52 can be obtained as follows.

The fourth arithmetic unit 51 executes the following Equation 1 or 2.

$$A_i = A_{i-1} + A\max \times 2^{-i} \quad \text{(Equation 1)}$$

$$A_i = A_{i-1} - A\max \times 2^{-i} \quad \text{(Equation 2)}$$

In the Equations 1 and 2, i=1, 2 . . . n, and $A_0$=Ay. The fourth arithmetic unit 51 repeatedly calculates the Equation 1 or 2 until the actual amplitude Ay converges into the reference amplitude ARy or until the next sampling is executed.

If the actual amplitude Ay is lower than the reference amplitude ARy, the comparator COMP selects the Equation 1 as the calculation equation executed by the fourth arithmetic unit 51. If the actual amplitude Ay is higher than the reference amplitude ARy, the comparator COMP selects the Equation 2 as the calculation equation executed by the fourth arithmetic unit 51. In this manner, the fourth arithmetic unit 51 conceptually calculates Ay±Ay/2±Ay/4±Ay/8±Ay/16 . . . .

The fifth arithmetic unit 52 executes the following Equation 3 or 4.

$$y_i = y_{i-1} + ya \times 2^{-i} \quad \text{(Equation 3)}$$

$$y_i = y_{i-1} - ya \times 2^{-i} \quad \text{(Equation 4)}$$

In the Equations 3 and 4, $y_0=ya$. The fifth arithmetic unit 52 repeatedly calculates the Equation 3 or 4 until the actual amplitude Ay converges into the reference amplitude ARy or until the next sampling is executed.

If the actual amplitude Ay is lower than the reference amplitude ARy, the comparator COMP selects the Equation 3 as the calculation equation executed by the fifth arithmetic unit 52. If the actual amplitude Ay is higher than the reference amplitude ARy, the comparator COMP selects the Equation 4 as the calculation equation executed by the fifth arithmetic unit 52. In this manner, the fifth arithmetic unit 52 conceptually calculates ya±ya/2±ya/4±ya/8±ya/16 . . . .

By allowing the fourth and fifth arithmetic units 51 and 52 to repeatedly execute the calculations synchronously, $A_i$ converges into the reference amplitude ARy and, at the same time, yi converges into the normalized signal ycn.

In this case, the Equations 1 to 4 include a multiplicative term for $2^{-i}$. However, to multiply $2^{-i}$ is equivalent to shifting of the binary value right by i bit. Accordingly, each of the fourth and fifth arithmetic units 51 and 52 does not actually include a multiplier or a divider but can be configured to include simply an adder, a subtractor, and a circuit that shifts a digital value right.

"Conversion accuracy" for each of the fourth and fifth arithmetic units 51 and 52 depends on the number of calculations. The conversion accuracy indicates a difference between yi and ycn and the conversion accuracy is higher if the difference is smaller. If the number of calculations i is increased, the conversion accuracy is improved. Conversely, if the number of calculations i is decreased, the conversion accuracy is deteriorated. The shift amount counter SC can store therein a predetermined value as the number of calculations. In this case, when i reaches a limit value, the fourth and fifth arithmetic units 51 and 52 finishes their calculations. By arbitrarily setting the limit value, the conversion accuracy can be arbitrarily set.

On the other hand, if the calculation continues until the next sampling and the number of calculations i is uncertain until the next sampling, the number of calculations i as well as the normalized signal ycn is stored in the correction value register R31 at the time of the next sampling. This is because the conversion accuracy is clear from the number of calculations i.

The waveform shaper 50 is provided to correspond to each of the sin signal and the cos signal. Accordingly, the waveform shapers 50 calculate the normalized signals ycn and xcn for the sin signal and the cos signal, respectively. Namely, the fourth and fifth arithmetic units 51 and 52, the comparator COMP, the first and second calculation value registers R11 and R21, the first and second selectors 56 and 57, the first and second shifting units SFT1 and SFT2, the shift amount counter SC, and the correction value register R31 are provided to correspond to each of the sin signal and the cos signal. Although the reference amplitude can be set to correspond to each of the sin signal and the cos signal, the reference amplitude is preferably common to (identical between) the sin signal and the cos signal.

As stated so far, the waveform correction apparatus according to the embodiment is configured to include adders and subtractors without including multipliers and dividers. Therefore, the waveform correction apparatus can be easily realized by the logic circuit and can be made quite small in scale as a whole. Moreover, the logic circuit is suitable for calculation of repetitive operation. By constituting the waveform correction apparatus according to the embodiment by the logic circuit, the calculation rate can be accelerated.

The waveform correction apparatus according to the embodiment can automatically normalize the sin signal and the cos signal without depending on operator's visual recognition. It is, therefore, possible to execute highly accurate normalization of the sin signal and the cos signal at low cost in short time. Moreover, even if the amplitudes of the sin signal and the cos signal dynamically change, the waveform correction apparatus according to the embodiment can normalize the sin signal and the cos signal by automatically and quickly following the amplitude changes.

The invention claimed is:

1. A waveform correction apparatus for periodically sampling a waveform signal indicating an angle or a position of a moving body making a rotational movement or a reciprocating movement, and for correcting a digital signal obtained by digitizing the waveform signal, comprising:
   a maximum and minimum value detector detecting a maximum value and minimum value of the digital signal using a digital signal at a certain time point and digital signals obtained by sampling before the certain point;
   a first arithmetic portion calculating an offset value of an intermediate value between the maximum value and the minimum value of the digital values with respect to a preset reference value serving as an intermediate value of the waveform signal;
   a second arithmetic portion calculating an actual amplitude of the digital signal by subtracting or adding the offset value from or to the maximum value or the minimum value of the digital signal;
   a third arithmetic portion generating a first correction signal by subtracting or adding the offset value from or to the digital signal at the certain time point;
   a fourth arithmetic portion adding or subtracting a value obtained by shifting a figure of the actual amplitude from or to the actual amplitude so that the actual amplitude converges into a preset reference amplitude; and
   a fifth arithmetic portion adding or subtracting a value obtained by shifting the first correction signal by an amount identical to a shift amount of the actual amplitude from or to the first correction signal so that the first correction signal converges into a second correction signal, the fifth arithmetic portion simultaneously executing addition or subtraction with execution of addition or subtraction by the fourth arithmetic portion;
   wherein the fourth arithmetic portion repeatedly calculates an equation 1 or an equation 2 until $A_i$ converges into the preset reference amplitude or until next sampling is executed:

$$A_i = A_{i-1} + A\mathrm{max} \times 2^{-i} \qquad \text{(Equation 1)}$$

$$A_i = A_{i-1} - A\mathrm{max} \times 2^{-i} \qquad \text{(Equation 2)}$$

where i=1, 2, . . . n, $A_0$=Amax, and the Amax is the actual amplitude;
   wherein the fifth arithmetic portion repeatedly calculates an equation 3 or an equation 4 until the $A_i$ converges into the preset reference amplitude or until the next sampling is executed:

$$y_i = y_{i-1} + ya \times 2^{-i} \qquad \text{(Equation 3)}$$

$$y_i = y_{i-1} - ya \times 2^{-i} \qquad \text{(Equation 4)}$$

where i=1, 2, . . . n, $y_0=ya$, and the ya is the digital signal at the certain time point; and
   wherein $y_i$ is output as the corrected digital signal.

2. The waveform correction apparatus according to claim 1, wherein when the actual amplitude is lower than the reference amplitude, the fourth arithmetic portion calculates the equation 1 and the fifth arithmetic portion calculates the equation 3, and when the actual amplitude is higher than the reference amplitude, the fourth arithmetic portion calculates the equation 2 and the fifth arithmetic portion calculates the equation 4.

3. The waveform correction apparatus according to claim 1, wherein
the digital signal is expressed by a sin signal and a cos signal, and
the first arithmetic portion to the fifth arithmetic portion are provided to respectively correspond to each of the sin signal and the cos signal, and the first arithmetic portion to the fifth arithmetic portion respectively execute calculations for the sin signal and the cos signal.

4. The waveform correction apparatus according claim 1, wherein
the digital signal is expressed by a sin signal and a cos signal, and
the first arithmetic portion to the fifth arithmetic portion are provided to respectively correspond to the sin signal and the cos signal, aid the first arithmetic portion to the fifth arithmetic portion respectively execute calculations for the sin signal and the cos signal.

5. The waveform correction apparatus according claim 2, wherein
the digital signal is expressed by a sin signal and a cos signal, and
the first arithmetic portion to the fifth arithmetic portion are provided to respectively correspond to the sin signal and the cos signal, and the first arithmetic portion to the fifth arithmetic portion respectively execute calculations for the sin signal and the cos signal.

6. The waveform correction apparatus according to claim 3, further comprising a maximum and minimum value register holding a maximum value xmax of the cos signal, a minimum value xmin of the cos signal, a maximum value ymax of the sin signal, and a minimum value ymin of the sin signal from among a plurality of digital signals sampled in an interval in which a sign of one of the sin signal and the cos signal is constant.

7. The waveform correction apparatus according to claim 1, wherein the first arithmetic portion is an adder adding up the maximum value and the minimum value of the digital signal, and shifting a figure of an addition result value by one.

8. The waveform correction apparatus according to claim 4, further comprising:
a first lowpass filter provided between the maximum and minimum value register and the second arithmetic portion; and
a second lowpass filter provided between the first arithmetic portion and the second arithmetic portion.

9. The waveform correction apparatus according to claim 1, further comprising:
a first calculation value register holding a calculation result of the fourth arithmetic portion;
a second calculation value register holding a calculation result of the fifth arithmetic portion;
a first selector transmitting the actual amplitude to the fourth arithmetic portion in an initial calculation right after a sampling, and transmitting data held in the first calculation value register to the fourth arithmetic portion in calculations after the initial calculation;
a second selector transmitting the first correction signal to the fifth arithmetic portion in an initial calculation right after the sampling, and transmitting data held in the second calculation value register to the fifth arithmetic portion in calculations after the an initial calculation;
a comparator comparing the actual amplitude or the data held in the first calculation value register which is selected by the first selector with the reference amplitude, and deciding addition or subtraction as the calculations executed by the fourth and the fifth arithmetic portions according to the comparison result;
a first shifting portion shifting a figure of the actual amplitude;
a second shifting portion shifting a figure of the first correction signal; and
a correction value register holding the second correction signal.

10. The waveform correction apparatus according to claim 9, wherein
the digital signal is expressed by a sin signal and a cos signal, and
the first arithmetic portion to the fifth arithmetic portion, the first calculation value register and the second calculation value registers the first selector and the second selector, the first shifting portion and the second shifting portion, and the correction value register are provided to correspond to each of the sin signal and the cos signal.

11. A waveform correction method periodically sampling a waveform signal indicating an angle or a position of a moving body making a rotational movement or a reciprocating movement, and correcting a digital signal obtained by digitizing the waveform signal, comprising:
detecting, in an amplitude detection circuit, a maximum value and minimum value of the digital signal using a digital signal at a certain time point and digital signals obtained by sampling before the certain point;
performing a first arithmetic operation in the amplitude detection circuit to calculate an offset value of an intermediate value between the maximum value and the minimum value of the digital values with respect to a preset reference value serving as an intermediate value of the waveform signal;
performing a second arithmetic operation in the amplitude detection circuit to calculate an actual amplitude of the digital signal by subtracting or adding the offset value from or to the maximum value or the minimum value of the digital signal;
performing a third arithmetic operation in the amplitude detection circuit to generate a first correction signal by subtracting or adding the offset value from or to the digital signal at the certain time point;
performing a fourth arithmetic operation in a waveform shaping circuit to add or subtract a value obtained by shifting a figure of the actual amplitude from or to the actual amplitude so that the actual amplitude converges into a preset reference amplitude; and
performing a fifth arithmetic operation in the waveform shaping circuit to add or subtract a value obtained by shifting the first correction signal by an amount identical to a shift amount of the actual amplitude from or to the first correction signal so that the first correction signal converges into a second correction signal, the fifth arithmetic operation being simultaneously executed with the fourth arithmetic operation;
wherein in the fourth arithmetic operation, an equation 1 or an equation 2 is repeatedly calculated until $A_r$ converges into the preset reference amplitude or until next sampling is executed:

$$A_i = A_{i-1} + A\max \times 2^{-i} \quad \text{(Equation 1)}$$

$$A_i = A_{i-1} - A\max \times 2^{-i} \quad \text{(Equation 2)}$$

where i=1, 2, . . . n, $A_0$=Amax, and the Amax is the actual amplitude;

wherein in the fifth arithmetic operation, an equation 3 or an equation 4 is repeatedly calculated until the $A_i$ converges into the preset reference amplitude or until the next sampling is executed:

$$y_i = y_{i-1} + ya \times 2^{-i} \quad \text{(Equation 3)}$$

$$y_i = y_{i-1} - ya \times 2^{-i} \quad \text{(Equation 4)}$$

where i=1, 2, . . . n, $y_0$=ya, and the ya is the digital signal at the certain time point; and wherein $y_i$ is output as the corrected digital signal.

12. The waveform correction method according to claim 11, wherein when the actual amplitude is lower than the reference amplitude, the equation 1 is calculated in the fourth arithmetic operation, and the equation 3 is calculated in the fifth arithmetic operation, and when the actual amplitude is higher than the reference amplitude, the equation 2 is calculated in the fourth arithmetic operation, and the equation 4 is calculated in the fifth arithmetic operation.

13. The waveform correction method according to claim 11, wherein the digital signal is expressed by a sin signal and a cos signal, and the first arithmetic operation to the fifth arithmetic operation are respectively executed to each of the sin signal and the cos signal.

14. The waveform correction method according to claim 11, wherein the digital signal is expressed by a sin signal and a cos signal, and the first arithmetic operation to the fifth arithmetic operation are respectively executed to each of the sin signal and the cos signal.

15. The waveform correction method according to claim 12, wherein the digital signal is expressed by a sin signal and a cos signal, and the first arithmetic operation to the fifth arithmetic operation are respectively executed to each of the sin signal and the cos signal.

* * * * *